Figure 1:
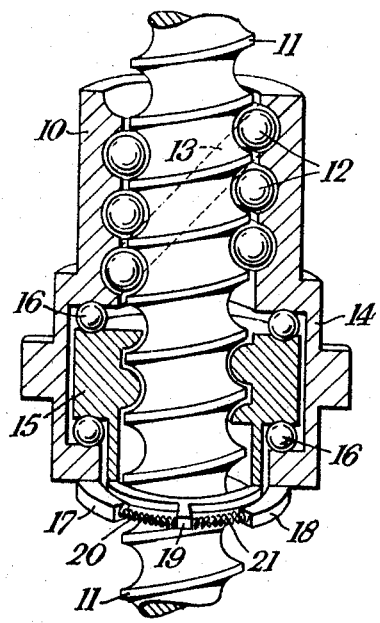

Feb. 21, 1967   W. J. BIRD   3,304,794
MECHANISMS INCORPORATING RECIRCULATING BALL SCREW-JACKS
Filed Jan. 21, 1965   4 Sheets-Sheet 1

INVENTOR: Walter J. Bird
Attorneys: Holla and Holte

Feb. 21, 1967 W. J. BIRD 3,304,794
MECHANISMS INCORPORATING RECIRCULATING BALL SCREW-JACKS
Filed Jan. 21, 1965 4 Sheets-Sheet 2

INVENTOR:
Attorneys:

United States Patent Office 3,304,794
Patented Feb. 21, 1967

3,304,794
MECHANISMS INCORPORATING RECIRCULATING BALL SCREW-JACKS
Walter John Bird, Feltham, Middlesex, England, assignor to British Aircraft Corporation (Operating) Limited, London, England, a British company
Filed Jan. 21, 1965, Ser. No. 426,778
Claims priority, application Great Britain, Jan. 23, 1964, 3,005/64; June 25, 1964, 26,377/64
6 Claims. (Cl. 74—409)

The invention has reference to mechanisms incorporating recirculating ball screw-jacks. The low frictional resistance of such devices, whilst being of considerable advantage in their normal operation, may in certain circumstances be disadvantageous, in that the interruption of the input torque to the screw permits the latter to reverse under the reaction of the displaced load. For example, the failure of a part of the mechanism which supplies the power input could result in uncontrolled reversal of the intended direction of movement of the load-carrying mechanism.

With the object of providing means for automatically preventing the linear movement of the screw relative to the nut in a recirculating ball screw jack, in the circumstances referred to, the present invention provides the combination of a recirculating ball nut and a plain nut of conventional irreversible form, operatively associated so as to be capable of operating tandemwise upon the same screw and connected with capability of limited relative rotational motion on the screw-thread, the arrangement being such that in normal operation the rotation of the screw is first effective to rotate the plain nut until the clearance of the recirculating ball nut on the screw has been taken up, whereupon the load is transferred to the recirculating ball nut. As will be understood, the effect of the rotation of the jack in reverse on a mechanical failure in the mechanism connected to the screw-jack is to transfer the load from the recirculating ball nut to the plain (irreversible) nut.

The combination mentioned above is subject to free play in the axial sense resulting from manufacturing tolerances and wear between the plain nut and the screw-thread. This free play is of consequence when the load is taken by the plain nut, that is, when the recirculating balls are unloaded. It results in free play when the screw jack is stationary and backlash when the direction of rotation of the screw is reversed.

A further feature of the invention, by which in the majority of conditions the above-mentioned free play may be reduced to negligible proportions, consists in the combination with the recirculating ball nut of two plain nuts of conventional irreversible form, operatively associated so as to be capable of operating upon the same screw and connected so that the two plain nuts are each capable of the same degree of independent angular movement relative to the ball nut, and including resilient means urging said plain nuts in opposite senses so as to eliminate axial play between the plain nuts and the screw-thread, the arrangement being such that in normal operation the rotation of the screw is effective to rotate the plain nuts until the clearance of the recirculating ball nut on the screw has been taken up, whereupon the load is transferred to the recirculating ball nut.

Figure 8:
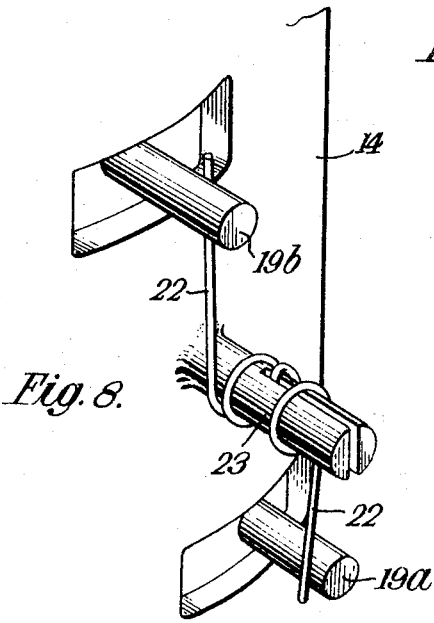
Figure 6:
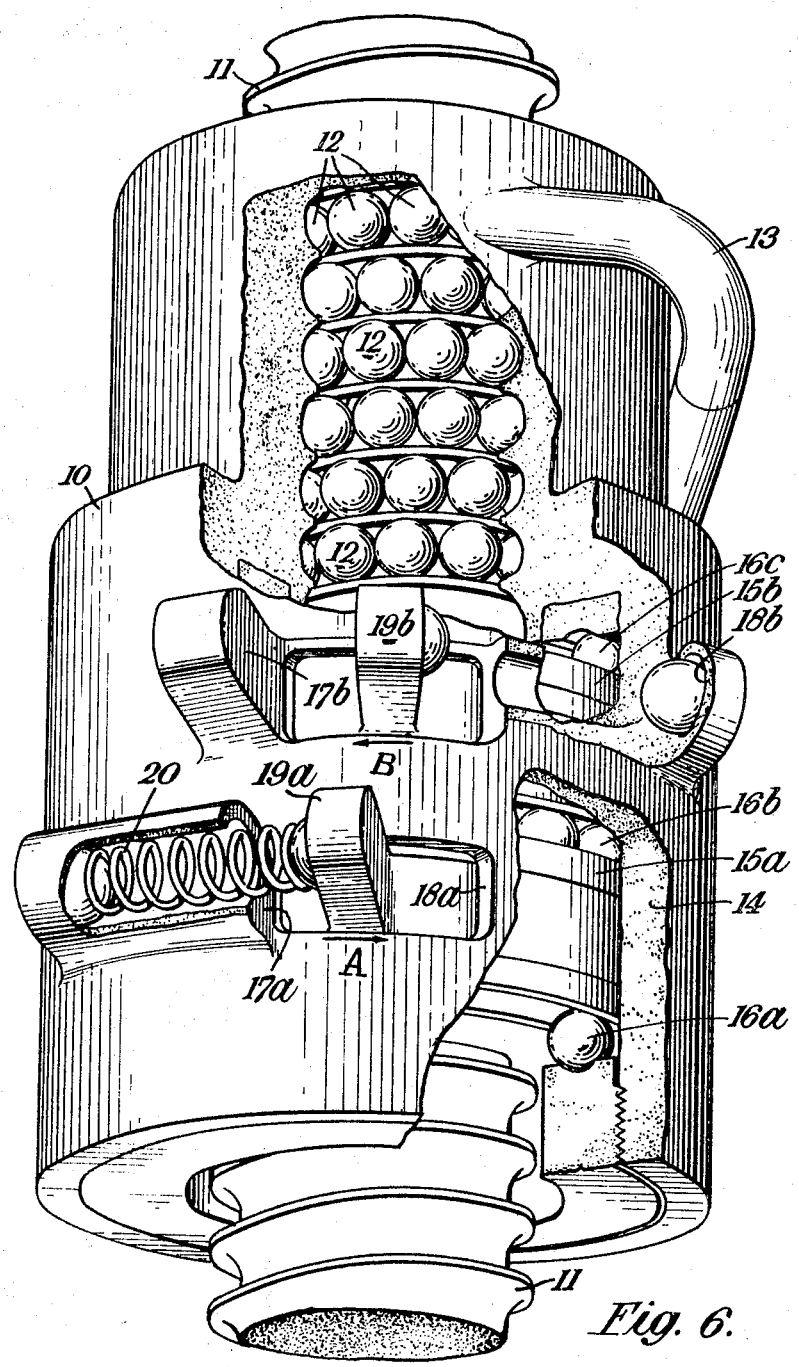
Figure 7:
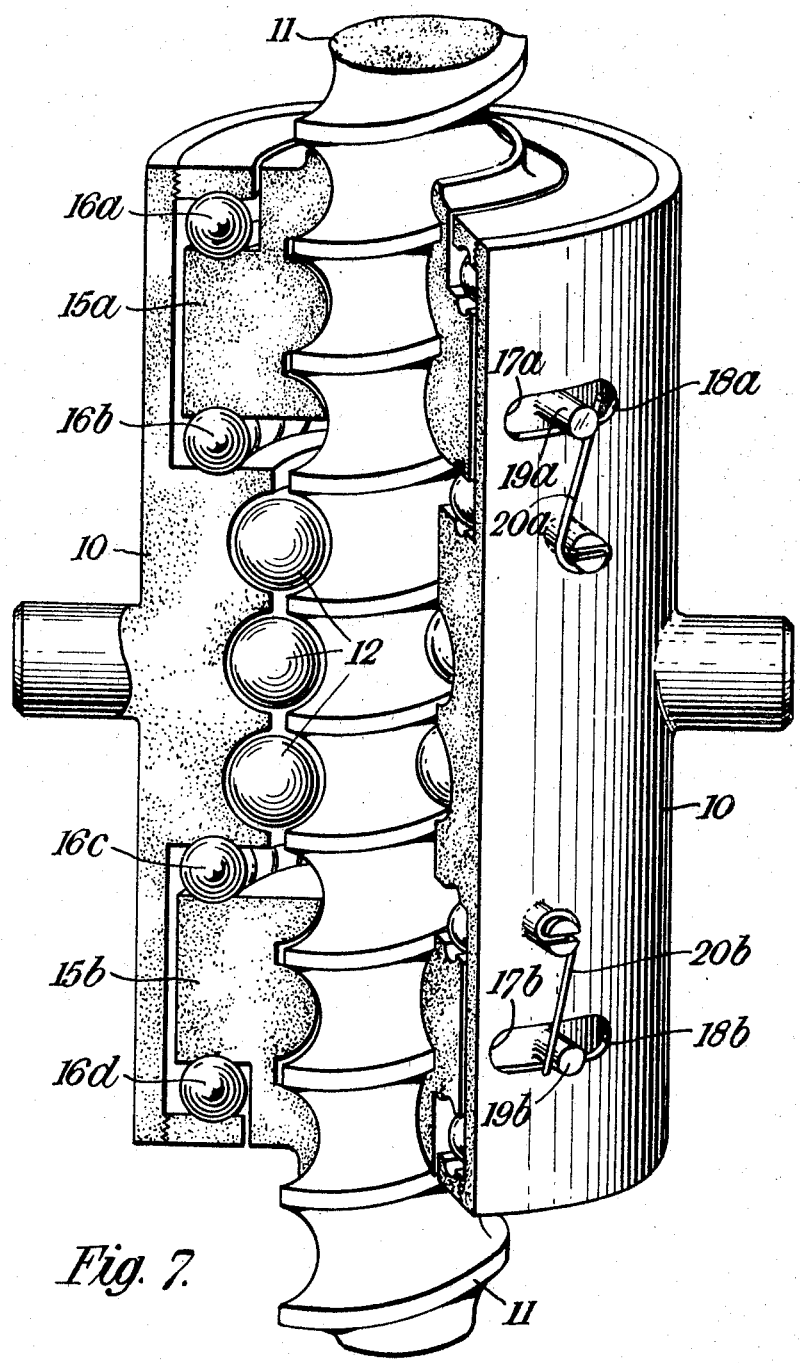

The manner in which the invention may be carried into effect is hereinafter described with reference to the accompanying diagrammatic drawings in which FIGS. 1 to 5 are sectional elevations of a first embodiment of the invention, showing the relative positions of the parts of a screw-jack in five different loading conditions, FIGS. 6 and 7 are part sectional elevations respectively of two further embodiments, and FIG. 8 is a detail view of an alternative means for biasing the two plain nuts of the embodiment shown in FIG. 6.

The screw-jack illustrated in FIGS. 1 to 5 comprises a recirculating ballnut 10, arranged to co-operate with the screw 11, the balls 12 being received in the groove of the screw and re-circulated through a duct which, for greater clarity of illustration, is not shown in the drawing but is represented diagrammatically by the dotted lines 13. At one end of the nut 10 is a housing 14 within which is a plain nut 15, hereinafter termed the lock-nut, which likewise co-operates with the screw 11 but is free to rotate with respect to the nut 10 between the ball races 16, within limits determined by stops 17 and 18 on the housing 14, which co-operate with a peg 19 on the lock-nut 15. Said ball races are adjusted to reduce axial movement between the lock-nut 15 and its housing in the recirculating nut 10 to a minimum.

A small clearance is provided between the recirculating ball diameters and the faces of their associated thread grooves on both the nut 10 and the screw 11, so that the screw 11 must be rotated to take up such clearance before the balls 12 are in contact with both the nut and screw (i.e. in a load carrying position). The thread grooves on the lock nut 15 are in such spaced relationship with the thread grooves on the recirculating nut 10 that thread continuity is exact when the peg 19 is midway between the stops 17 and 18 and the recirculating balls 12 then occupy the "unloaded" position illustrated in FIG. 1. Thus rotation of the lock nut 15 with the screw 11 will alter the spaced relationship of the thread grooves on the recirculating nut 10 with the thread grooves on the lock nut 15 and will bring the balls 12 into contact with both the recirculating nut 10 and the screw 11.

Figure 2:
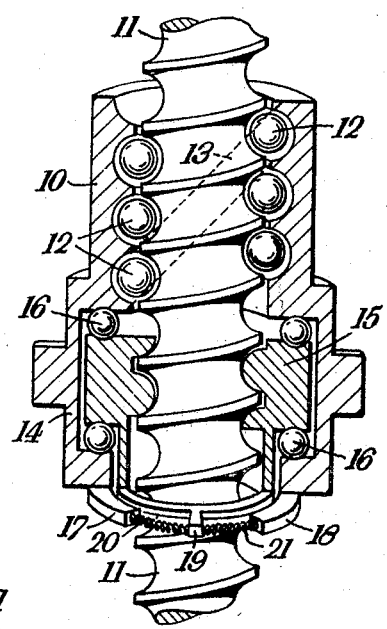
Figure 3:
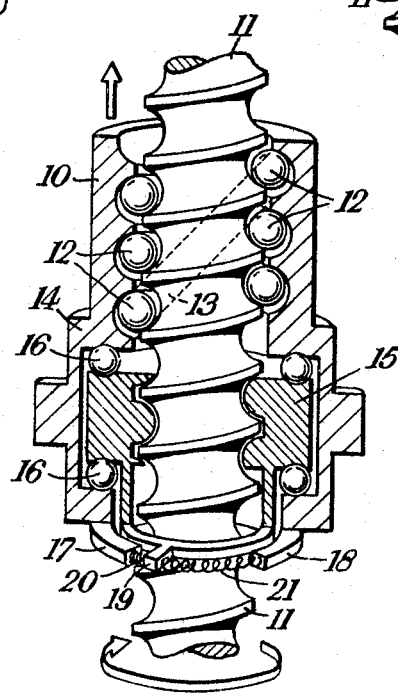

In operation, to start with the recirculating balls 12 are in the centralised, unloaded position, and the peg 19 in its midway position between stops 17 and 18 as shown in FIG. 1. If an axial load is now applied to the recirculating nut 10 backlash between the plain nut 15 and the screw 11 is first taken up, and the load path is from the recirculating nut 10 to the plain nut 15 to the screw 11, as can be seen in FIG. 2. When the screw 11 is now rotated, the lock nut 15 is caused to rotate with it. This is due to the rolling friction of the ball races 16 being at all times considerably less than the sliding friction between the lock nut 15 and the screw 11. As the lock nut 15 rotates with the screw 11, the clearance between the balls 12 and the threaded grooves is taken up, as shown in FIG. 3. The lock nut 15 is thereafter restrained from further rotation by co-operation of the peg 19 with the stop 17 (FIG. 3). Rotation of the screw in the opposite direction would have brought the peg 19 into contact with the stop 18. The total effect of this operation is to transfer the axial load initially borne by the lock nut 15 to the recirculating balls 12 and the lock nut 15 being unloaded, the screw may be operated to actuate the control organ normally.

Figure 4:
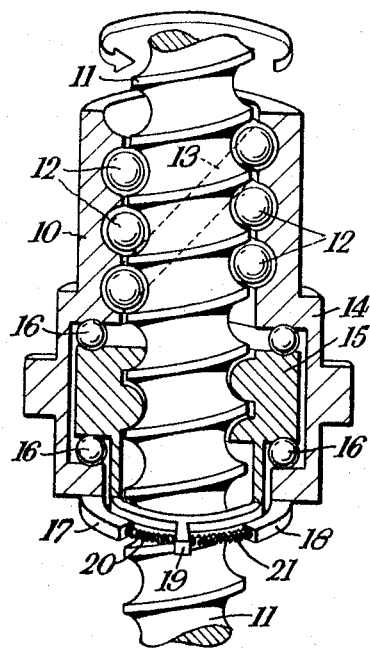
Figure 5:
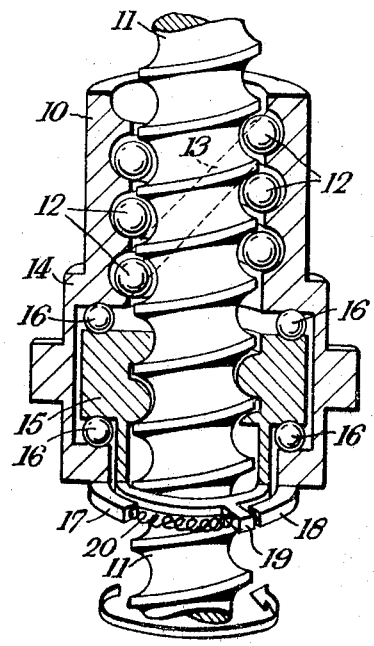

FIG. 4 shows the condition when, the jack having been operated to displace a load, it is held in the loaded condition preparatory to reversal.

In normal operation, reversal of the direction of rotation of the screw 11 will rotate the lock nut 15 from the position in which its peg 19 is against the stop 17, through its midway position to co-operate with the stop 18 (FIG. 5), thereby axially moving the recirculating nut 10 relative to the screw 11 from one ball "loaded" position, through the ball "no load" position to the opposite ball "loaded" position.

If, however, when the screw 11 is being operated against an axial load on the nut 10 the screw 11 becomes free or "runs away" due to failure of part of the mechanism to which it is connected, the screw 11 will reverse under its own weight or the reaction of the load. The lock nut 15 will immediately rotate with the screw 11 to its position in which the peg 19 lies midway between the stops 17 and 18, such rotation re-establishing the exact thread continuity between the recirculating nut 10 and the lock nut 15 to then bring about the ball "unloaded" position. The axial load is thus transferred from the balls 12 to the lock nut 15, which being irreversible prevents further rotation and hence any linear movement of the screw 11.

To ensure that the lock nut 15 is normally maintained in its midway or "locking" position (i.e. with the recirculating balls 12 unloaded) should a fault occur, coil springs 20 and 21 are inserted between the peg 19 and the stops 17 and 18 respectively, such springs tending to urge the peg 19 and hence the lock nut 15 into its midway position and so ensuring that the recirculating balls 12 remain unloaded.

In the embodiment shown in FIG. 6, the numeral 10 indicates a recirculating ball nut of which the balls 12 co-operate with the screw 11 and are recirculated through the duct 13. At one end the nut body 10 incorporates a housing 14 enclosing two plain nuts 15a and 15b which co-operate with the screw 11 and are free to rotate with respect to the nut 10 and also with respect to each other, within limits determined as hereinafter described.

The plain nut 15a is mounted between the thrust races 16a and 16b, and the plain nut 15b is mounted between the thrust races 16b and 16c. The plain nut 15a carries a lug 19a and its angular movement is limited in the extreme case by spaced stops 17a and 18a, against one of which said lug 19a is arranged to abut according to the direction of its movement; a coil spring 20 is arranged to bias the nut 15a in the direction of the arrow A. The plain nut 15b carries a lug 19b and its angular movement is limited in the extreme case by spaced stops 17b and 18b against one of which said lug 19b is arranged to abut according to the direction of its movement; a coil spring (not shown) is provided for biassing the nut 15b in the direction of the arrow B.

In the modification shown in FIG. 8, the stops 19a and 19b of the plain nuts 15a and 15b, are biassed by a single spring 22 attached at its mid-point to a peg 23 fixed to the exterior of the housing 14.

In the embodiment illustrated in FIG. 7, the plain nuts 15a and 15b are disposed at opposite ends of the recirculating ball system 12, the thrust races for the nut 15a being shown at 16a and 16b, and those for the nut 15b at 16c and 16d. In this case the respective biassing springs are shown at 20a and 20b.

In both the aforedescribed embodiments the lugs 19a and 19b are arranged to bring the external thread faces of the nuts 15a and 15b into contact with the thread faces of the screw 11 when said lugs are in alignment with respect to the screw axis, and any wear on such thread faces is compensated by the biassing springs.

It will be seen that in the embodiment shown in FIG. 7, the plain nuts may be arranged to clean the threads of the screw.

What I claim as my invention and desire to secure by Letters Patent is:

1. The combination of a recirculating ball nut and a plain nut element of conventional irreversible form, operatively connected to operate tandemwise upon the same screw and connected together for limited relative rotational motion on the thread of said screw, the arrangement being such that in normal operation the rotation of the screw is first effective to rotate the plain nut until the clearance of the recirculating ball nut on the screw has been taken up, whereupon the load is transferred to the recirculating ball nut.

2. The combination claimed in claim 1, wherein the plain nut element is in two parts, each being operatively connected for operating on the same screw and connected to the recirculating ball nut so that said two plain nut parts are each capable of the same degree of independent angular movement on the thread of said screw relative to the ball nut, and including resilient means effective to urge said plain nut parts in opposite senses of rotation so as to eliminate axial play between the plain nut parts and the screw-thread, the arrangement being such that in normal operation the rotation of the screw is effective to rotate the plain nut parts until the clearance of the ball nut on the screw thread has been taken up whereupon the load is transferred to the ball nut.

3. The combination claimed in claim 1, wherein the recirculating ball nut incorporates a housing for the plain nut element, said housing carrying oppositely disposed spaced stops arranged to limit the rotational movement of the plain nut element (or the parts thereof) relative to the ball nut by abutment of one or other of said stops against a detent carried by the plain nut element or a part thereof.

4. The combination claimed in claim 3, including spring means between each stop and said detent, effective normally to maintain the detent in mid-position with the recirculating ball nut in unloaded condition.

5. The combination claimed in claim 3, wherein the ball nut incorporates a housing capable of accommodating both parts of the plain nut element.

6. The combination claimed in claim 3, wherein the housing of the ball nut includes ball thrust bearings for the plain nut element.

References Cited by the Examiner

UNITED STATES PATENTS

| 2,447,439 | 8/1948 | Thompson | 74—441 X |
| 2,623,403 | 12/1952 | Terdina | 74—441 X |

DAVID J. WILLIAMOWSKY, *Primary Examiner.*

L. H. GERIN, *Assistant Examiner.*